April 22, 1952 — R. R. RIESZ — 2,593,698
APPARATUS FOR DETERMINING PITCH FREQUENCY IN A COMPLEX WAVE
Filed May 10, 1948 — 2 SHEETS—SHEET 1

INVENTOR
R. R. RIESZ
BY H. A. Burgess
ATTORNEY

April 22, 1952   R. R. RIESZ   2,593,698
APPARATUS FOR DETERMINING PITCH FREQUENCY IN A COMPLEX WAVE
Filed May 10, 1948   2 SHEETS—SHEET 2
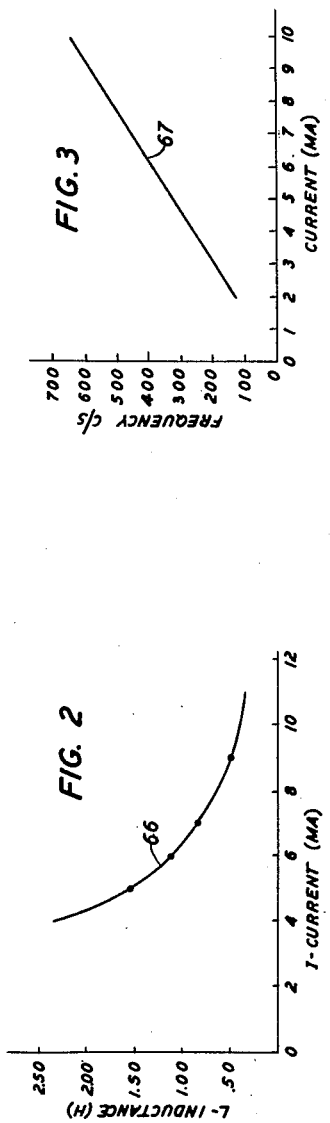
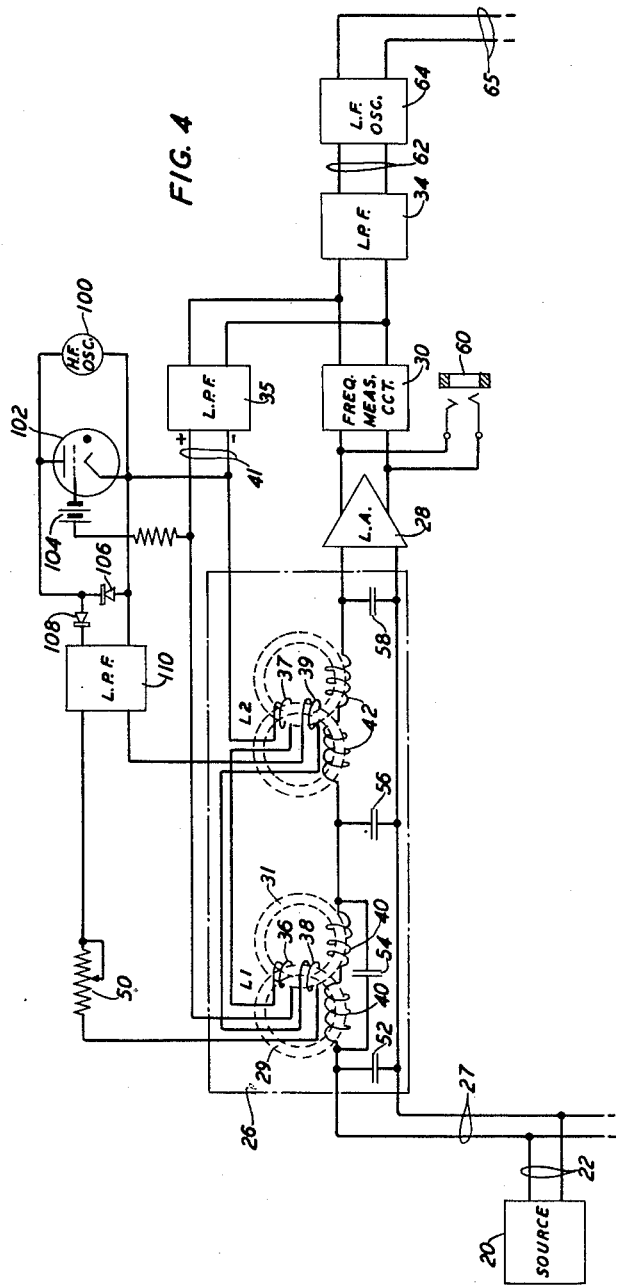
INVENTOR
R. R. RIESZ
BY H. A. Burgess
ATTORNEY Patented Apr. 22, 1952

2,593,698

UNITED STATES PATENT OFFICE 2,593,698

APPARATUS FOR DETERMINING PITCH FREQUENCY IN A COMPLEX WAVE

Robert R. Riesz, Chatham, N. J., assignor to Bell Telephone Laboratories, Incorporated, New York, N. Y., a corporation of New York Application May 10, 1948, Serial No. 26,026

14 Claims. (Cl. 175—183)

This invention relates to signaling systems and more particularly to such systems in which complex signal waves are analyzed to determine their physical characteristics.

Certain types of signaling systems have been proposed in which the intelligence bearing speech signal waves are analyzed to determine their fixed and variable physical characteristics. The intelligence contact of the wave may then be transmitted to a receiving station by transmitting only the information concerning the variable characteristics of the wave, since the fixed characteristics of the wave are known at the receiving point. A system of this general type was described and claimed in United States Patent 2,151,091, March 21, 1939, to H. W. Dudley. As is there described, such a system operates by analyzing the speech signal wave to determine the distribution of the energy content of the wave throughout its frequency spectrum. At the same time, the wave is subjected to a second analysis to determine whether it originated from an unvoiced sound, or from a voiced sound. If the signal wave arose from the voiced type of sound, its pitch, or the frequency of the fundamental wave component, is also determined. The results of these analyses may then be transmitted to a receiving point where they are utilized in synthesizing, or reconstructing, the original signal wave.

In the above-described type of system, if the range of frequencies of the fundamental, or basic, wave component is limited to about one octave, the fundamental component may be extracted directly from the signal wave by means of ordinary selective network circuits. However, if the frequency of this component may be expected to vary more than about one octave, the fixed frequency network does not provide a satisfactory device for its extraction. One difficulty arises since the human voice usually includes a strong second harmonic component which, for the lower portion of the component's frequency range, may lie within the pass band of the selective network. A second difficulty arises since the second harmonic component may occasionally, and momentarily, exceed the level of the fundamental component. Although a considerable portion of the message intelligence may be transmitted while limiting the fundamental component to a frequency range of about one octave, it is highly desirable to permit this component greater freedom of variation.

It has been proposed that these difficulties may be resolved by disregarding the real fundamental component, and reconstructing its equivalent by detecting a number of the higher frequency wave components in a suitable arrangement. This proposed method is satisfactory in many instances, but a suitable detecting process usually necessitates considerable apparatus, and the process may occasionally, and momentarily, produce erroneous pitch indications. Ordinarily, the equivalent component is derived from the detecting action between a number of adjacently related wave components. However, the phase and amplitude relations of the components are variable, and it occasionally happens that the desired output product is derived from non-adjacent wave components. In view of these difficulties, it appears desirable to extract the fundamental component of a complex signal wave by a direct selective process in such manner that no wave component having a frequency in excess of the fundamental frequency may be selected.

It is a feature of the invention that, although the fundamental component is directly extracted, it may nonetheless vary throughout a frequency range that is considerably in excess of an octave.

It is also a feature of the invention that it employs a variable, or tracking, selecting network the selective properties of which are variable in accordance with changes in the frequency of the fundamental component of the applied signal wave.

In accordance with the invention, the signal wave may be passed through a variable selecting arrangement that is so constructed and arranged that its upper cut-off frequency, or the frequency at which the selective arrangement starts to attenuate the transmitted wave, progressively lowers as the frequency of the wave components transmitted therethrough is lowered. As the frequency of the wave components that are passing through the selective arrangement is lowered, or reduced, the selective arrangement changes its characteristics such that its upper frequency limit is reduced to a value that is slightly in excess of the frequency of the lowest frequency component that is present in the signal wave.

The manner in which the invention makes possible the realization of the foregoing features and advantages may best be understood from the following description of a preferred embodiment, when considered in conjunction with the drawing, in which:

Figs. 2 and 3 are explanatory graphs to which references are made in the detailed description; and Fig. 4 is a schematic diagram of a second embodiment of the invention which is suitable for use in the pitch determining branch of a wave analyzing and synthesizing signaling system.

Figure 1:
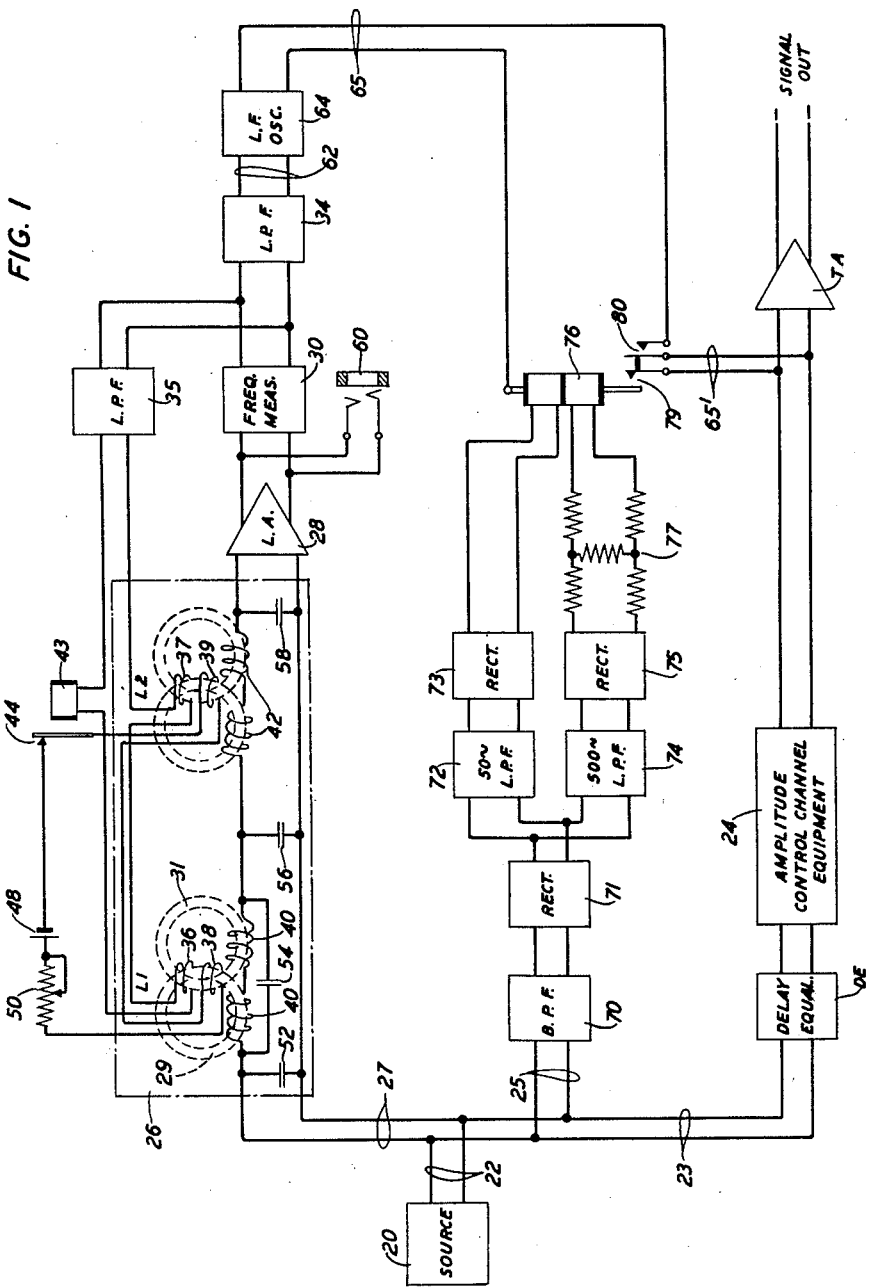
Fig. 1 is a schematic diagram of an embodiment of the invention when arranged in the pitch determining branch of a wave analyzing and synthesizing signaling system.

In Fig. 1 there is indicated an embodiment of the invention when arranged for operation in the pitch-determining branch of the so-called vocoder type of signal analyzing and synthesizing system. Speech signal waves are derived from source 20, and are supplied over connecting circuit 22 to the three parallel branch circuits of the system. In the lower branch circuit 23, the delay equalizer DE, and the amplitude control channel equipment 24, function to derive the amplitude control currents which indicate the spectrum distribution of the signal wave energy. This apparatus 24 may comprise the same structure as that is indicated between the delay equalizer DE and the transmitting amplifier TA of Fig. 2 of H. W. Dudley's Patent 2,151,091, March 21, 1939. Reference may be made to that patent for a description of the structure and operation of such apparatus.

The middle circuit branch 25, including the band-pass filter 70 and the polar relay 76, constitutes an arrangement for disconnecting the pitch-determining equipment of the upper circuit branch 27 from the remainder of the signaling system when the signal wave derived from source 20 possesses no fundamental wave component. Signal waves that are derived from the unvoiced type of sounds are characterized by the absence of this fundamental frequency component. The structure and operation of this circuit arrangement may, except for one slight exception, be the same as that shown and described in connection with the like-numbered circuit arrangement of Fig. 1 of United States Patent 2,243,527, May 27, 1941, to H. W. Dudley. The above-referred to slight exception is concerned with the arrangement of the relay contacts of relay 76. In the Dudley patent, the polar relay 76 has a single set of contacts that are used for connecting oscillator 78 to the outgoing circuit 14 of the Dudley patent. In the circuit arrangement of the present embodiment, polar relay 76 has a double set of contacts 79, 80. In the presence of the voiced type of signal waves, these contacts are operated and connect the output of low frequency oscillator 64 to the input of the transmitting amplifier TA. Reference may be had to the above-mentioned Dudley Patent 2,243,527 for a complete description of the structure and the method of operation of this circuit. For description purposes in connection with the description of Fig. 1 herein, it is sufficient to note that relay contacts 79 and 80 are in their operated or closed positions, when the speech signals derived from source 20 are of the voiced type possessing a definite fundamental frequency component.

The upper circuit branch 27 includes selective network 26, a conventional limiting amplifier 28, frequency measuring circuit 30, a low-pass filter 34 and a second low-pass filter 35. The frequency measuring circuit 30 may be any suitable arrangement, for example, one such as indicated in Fig. 2 of my Patent 2,183,248, December 12, 1939. This circuit 30 produces a unidirectional voltage pulse of uniform amplitude and duration during each complete cycle of its operation, as is explained in detail in Patent 2,183,248. Measuring circuit 30 includes biasing means for adjusting its operating threshold such that a predetermined input voltage level is required to initiate its cycle of operation. This minimum operating energy level may be so adjusted that the actuating voltage from limiting amplifier 28 must contain either the fundamental wave component, or a wave component that possesses a maximum voltage value that is equal to the like value of the fundamental wave component. The unidirectional voltage pulses produced by circuit 30 are smoothed, or averaged, in the conventional low-pass filters 34, 35 which may have upper cut-off frequency limits of about 25 and 70 cycles per second, respectively. Inasmuch as these voltage pulses are of uniform amplitude and duration, the magnitude of the averaged, or smoothed, voltages after passing through filters 34, 35 will vary linearly with the frequency of the fundamental wave component that controls measuring circuit 30.

Selective network 26 may include two substantially equivalent inductors L1 and L2. Because of their similarity, the structure of these inductors will be described with reference only to inductor L1. This inductor employs three coils or windings 36, 38, 40 distributed upon two toroidal cores 29, 31. The turns of inductance element or winding 40 are evenly distributed between the two cores, and are connected such that similarly directed magnetic fields are induced in the two cores 29, 31. Windings 36, 38 may comprise equal numbers of turns, each of which encircles both cores. Although not interconnected, these windings are positioned such that their flux producing effects are additive. Current flowing in either one, or both, of the windings 36, 38 produces flux in each toroidal core, and influences the effective inductance of element 40 in inverse relation to the square of the magnitude of the current. This relation may be expressed as:

$$L = \frac{k}{I^2}$$

where L is in henries, I is in milliamperes, and $k$ is a circuit constant that is determined by the construction of the coil. Curve 66 (Fig. 2) indicates the relation between the effective inductance of element 40 and the current flowing through the biasing windings 36, 38 of an inductor, such as the above described L1, for which the value of $k$ was substantially 40. From this curve it will be noted that the effective inductance L varies from about 2.4 henries, when 4.0 milliamperes of current flows in biasing windings 36, 38, to about .4 henry when this current is increased to 10 milliamperes.

Coil windings 38 and 39 of inductors L1 and L2, respectively, are included in a series circuit with the potential source 48, adjustable resistor 50 and relay contacts 44. Windings 36, 37 of inductors L1, L2, respectively, are connected to the output of low-pass filter 35, and are in a series circuit which includes the winding of relay 43. Current flowing through coils 36, 37 operates the relay 43 to open contact 44 and break the series connection through windings 38, 39. In accordance with this arrangement, current may flow in the circuit including windings 38, 39 or that including windings 36, 37, but may not simultaneously flow in both sets of windings.

The effective inductance of elements 40, 42, of inductors L1, L2, respectively, and hence the cut-off frequency of the selective network 26, may be changed by varying the magnitude of the currents flowing in the biasing windings 36, 37, 38, 39. Inductive elements 40, 42 and capacitors 52, 54, 56 and 58 comprise a low-pass filter, the cut-off frequency ($f_c$) of which follows the relation, $$f_c = \frac{1}{\pi\sqrt{LC}}$$

Since the inductance of elements 40, 42 may be expressed as $$L = \frac{k}{I^2}$$

the cut-off frequency ($f_c$) of network 26 follows variations in the biasing current in accordance with the expression, $$f_c = \frac{I}{\pi\sqrt{kC}}$$

If capacitors 52, 54, 56 and 58 are respectively proportioned .305 microfarad, .08 microfarad, .61 microfarad, and .305 microfarad, the network 26 will cut off at approximately 640 cycles per second when 10 milliamperes of current flows through each of the biasing windings 36–39 inclusive. The network will have a similar cut-off frequency if the biasing current is changed such that 20 milliamperes flows through only windings 36 and 37, or windings 38 and 39. Similarly, the network will cut off at about 160 cycles per second when 2.5 milliamperes of current flows in the combined windings, or when 5 milliamperes flows in either pair of windings. Curve 67 (Fig. 3) indicates the manner in which the cut-off frequency of such a filter changes with variations in the magnitude of the biasing current flowing in its combined windings. The indicated current values would, of course, be increased if only a single pair of coils were energized.

In operation, the value of resistor 50 is adjusted such that the current through bias windings 38, 39 is sufficient to cause the network 26 to rest at its upper cut-off frequency of about 640 cycles when no signal is being derived from source 20. The frequency measuring circuit 30 may be adjusted such that, when there is applied to its input a fundamental wave component that uniformly varies in frequency from 80 to 400 cycles per second, the current flowing in coils 36, 37 linearly increases from 4 to 20 milliamperes. When so adjusted, network 26 has an initial cut-off frequency of about 640 cycles per second, when signals from source 20 are first transmitted through the network. Wave components of a frequency lower than 640 cycles are passed by network 26, are limited in amplifier 28, and actuate the frequency measuring circuit 30, to produce an output unidirectional voltage, the magnitude of which characterizes the frequency of the fundamental component of the actuating wave. This voltage divides between the low-pass filters 34 and 35. That portion of the voltage which is smoothed, or averaged, in low-pass filter 35 causes a biasing current to flow in the coil windings 36, 37 and winding of relay 43. Current flowing in the relay winding operates the relay, disengages or opens relay contact 44 and removes the fixed biasing current which has been operating through coil windings 38, 39. Simultaneously, the current flowing through coil windings 36, 37 exerts its control force, thereby causing inductive elements 40, 42 to assume new effective reactance values, which correspond to the new biasing current, and to change the cut-off frequency of network 26 in the previously explained manner. Thereafter, the cut-off frequency of network 26 is maintained at this controlled value so long as the fundamental frequency of the applied signal waves is unchanged, and of sufficient magnitude to control the operation of frequency measuring circuit 30. As the frequency of the fundamental wave component is changed, the cut-off frequency of network 26 varies such that it always remains at a value equal to about 1.6 times the frequency of the fundamental wave component. Thus, after the fundamental wave component has regulated the cut-off frequency of network 26, all higher harmonic wave components are suppressed, and although such a component may momentarily assume a greater level than the fundamental component, it does not cause an erroneous indication of a change in the signal pitch.

Simultaneously with the above-described action, a portion of the output voltage from measuring circuit 30 is smoothed, or averaged, in the 25-cycle low-pass filter 34. The magnitude of this voltage may be utilized to control the operation of oscillator 64 for example, either by amplitude or frequency control means, such that there are derived low frequency oscillations which are suitable for combination with the low frequency amplitude control currents produced by channel equipment 24. The output of oscillator 64 is connected to the input of transmitter amplifier TA over connecting paths 65, 65' and relay contacts 79, 80, since polar relay 76 is operated by the voiced signal wave.

An output jack 60 may be provided between the limiting amplifier 28 and frequency measuring circuit 30 to permit convenient access to the fundamental wave component after its selection by network 26. Although this output connection is not utilized in the described embodiment, under other circumstances it may be desirable to use the fundamental frequency directly instead of transforming it in the low frequency oscillator 64 as was previously described.

In Fig. 4, there is shown an embodiment of the invention in which the potential source, or battery 48, and relay contact 44, of the Fig. 1 embodiment are eliminated. In connection with the following discussion of this embodiment, it should be borne in mind that Fig. 4 indicates only the revised portion of the circuit arrangement of Fig. 1. For utilization in the frequency-determining branch of a signal synthesizing system, it will, of course, be necessary to provide the lower and middle circuit branch arrangements of Fig. 1, or their equivalents. The selective network 26, limiting amplifier 28, frequency meter 30, and low-pass filters 34, 35 may be constructed as was described in connection with the Fig. 1 embodiment. The polarity of the control voltages at the output of filter 35 is as shown, that is, the upper conductor of connecting path 41 is relatively more positive than the lower conductor of this path. Oscillator 100 provides a relatively high frequency output which may be in the neighborhood of about 10,000 cycles per second. Electron discharge device 102 may be a gas-filled tube having its anode-cathode circuit shunted across the output of oscillator 100. The cathode of tube 102 is also connected to the negative voltage output connection of filter 35. Bias source 104 is suitably adjusted to prevent current conduction in tube 102 when no voltage difference exists across the output of filter 35. Rectifier elements 106, 108 may be copper oxide varistors or similar suitable units, and are respectively in shunt and series connection with the output of oscillator 100. Filter 110 may be a conventional 25-cycle low-pass unit suitably adjusted to suppress the high frequency components from oscillator 100. The adjustable resistor 50 and coil windings 38 and 39 are arranged in series connection across the output of filter 110.

The operation of this circuit is such that the shunt rectifier 106 shorts the output of oscillator 100 during the negative half-cycle of its operation. The positive half-cycle of voltage is passed by the series rectifier 108, and is averaged in low-pass filter 110, to produce a substantially steady unidirectional voltage of sufficient magnitude to cause a suitable biasing current to flow through biasing coil windings 38, 39. As was previously described, this biasing current causes network 26 to assume its highest cut-off frequency. When a speech signal wave containing a well-defined fundamental wave component is applied to network 26, from source 20, the wave components of frequency less than about 640 cycles per second, in our assumed example, are transmitted to frequency measuring circuit 30. Circuit 30 causes unidirectional voltages, the magnitudes of which are proportional to the frequency of the applied fundamental component, to appear at the outputs of filters 34, 35. This voltage, at the output of filter 35, changes the control grid-cathode potential of tube 102 such that this tube now conducts current during the positive half of the cycles of alternation of oscillator 100. This conduction when combined with the effect of the shunt rectifier 106, interrupts the biasing current that has been passing through the coil windings 38, 39. Simultaneously with this action, the voltage from filter 35 initiates current flow in biasing windings 36, 37. This causes these coils to exert their proportionate influence in adjusting the cut-off frequency of network 26 to a new value, that may be equal to about 1.6 times the frequency of the fundamental component that is actuating measuring circuit 30. Coil windings 36, 37 will continue to control the cut-off frequency of network 26 so long as the applied signal waves contain a well-defined fundamental wave component. When a signal wave which does not contain such a fundamental wave component is received, the output voltage from filter 35 is reduced to zero, and the control grid of gas tube 102 regains control of that tube during the next negative half of the operating cycle of oscillator 100. This action restores current flow to coil windings 38, 39, and network 26 again assumes its maximum cut-off frequency.

From the foregoing description it will be appreciated that the practice of this invention is not limited to the specified type of selective network 26, nor to the designated control means for regulating the cut-off frequency of this device. Rather, the invention may be successfully employed whenever it is desired to segregate one or more of the lower frequency wave components from a number of such components when they are included in a complex wave of fixed or variable frequency.

What is claimed is:

1. In a system for segregating the fundamental component from the remaining components of a complex wave, a variable electrical network comprising a plurality of inductive and capacitive reactance elements proportioned to have initially an upper cut-off frequency above the highest frequency such fundamental component might be expected to have, means responsive to the wave component of greatest energy level after passing through said network for producing an electromotive force the magnitude of which varies in accordance with variations in the frequency of said component, and means responsive to said derived electromotive force for adjusting the reactive value of one of said network reactance elements and thereby the cut-off frequency of said network, the cut-off frequency being progressively adjusted as the magnitude of said electromotive force progressively changes so as to suppress harmonics of the wave component represented by the electromotive force.

2. In a system for segregating the fundamental component from the remaining components of a variable complex wave, a variable electrical network comprising at least one inductive and at least one capacitive reactance element proportioned to have initially an upper cut-off frequency above the highest frequency such fundamental component might be expected to have, means connected to the output of said network and responsive to the lowest frequency wave component the energy level of which exceeds a predetermined value after passing through said network for producing an electromotive force representative of said wave component and the magnitude of which varies in accordance with the frequency of said component, and means responsive to said derived electromotive force for adjusting the reactive value of at least one inductive reactance element in said network to alter the proportions and thereby the cut-off frequency of said network, whereby the cut-off frequency of said network is lowered as the magnitude of said derived electromotive force is reduced and is maintained slightly higher than the frequency of said lowest frequency wave component passing through said network.

3. In a system for deriving an indication of the frequency of the fundamental wave component of a complex signal wave, a variable selective network having input and output connections and comprising a capacitive element and an inductive element proportioned to have initially an upper cut-off frequency above the highest frequency such fundamental component might be expected to have, means connected to the output of said network for producing a unidirectional electromotive force the magnitude of which is proportional to the frequency of the lowest frequency wave component that is present in said wave after passing through said network, and means for feeding back a portion of said electromotive force to said inductive element to adjust the effective reactance of said element and to alter the proportions of said network such that the cut-off frequency of the network is adjusted to a value that suppresses harmonics of the wave component that the electromotive force represents.

4. In a system for analyzing complex waves and for segregating the fundamental wave component of said waves, an input circuit, a variable electrical network connected to said circuit and comprising a capacitor and an inductor, said inductor comprising a reactance element and a control element, the effective value of said reactance element being controllable in accordance with the magnitude of an electromotive force impressed across said control element, means connected to the output of said network for deriving therefrom an electromotive force the magnitude of which varies with changes in the frequency of the lowest frequency wave component transmitted through said network, and means for impressing upon said control element a portion of said derived electromotive force, whereby the effective reactance value of said reactance element and the frequency selective character of said network are controlled in accordance with the lowest frequency wave component that passes through said network.

5. A system for segregating the fundamental frequency wave component from a variable frequency complex wave, which system comprises variable electric network means for selecting that portion of the frequency spectrum of said wave that includes the range of frequencies such fundamental component might be expected to have, said means comprising reactance elements including a controlling element and a controlled element the value of which controlled element regulates the selective properties of said selecting means, means connected to the output of said selecting means for deriving from said wave an electromotive force the magnitude of which is proportional to the frequency of the lowest frequency wave component present in said wave, and means for feeding back to said controlling element a portion of said electromotive force whereby the effective reactance value of said controlled element and the selective properties of said selecting means are controlled by the magnitude of said electromotive force.

6. A system for segregating the fundamental wave component from a variable frequency complex wave which includes a plurality of wave components in integral harmonic relation, which system comprises a variable frequency-sensitive means for selecting that portion of the frequency spectrum of said wave that includes the range of frequencies such fundamental component might be expected to have, said means including a variable reactance element the reactance value of which controls the frequency characteristic of said selective means, voltage deriving means for producing a voltage the magnitude of which varies in accordance with the frequency separation between adjacently disposed components of said complex wave, and means responsive to the magnitude of said derived electromotive force for controlling the reactive value of said reactance element whereby said selective means is maintained at a cut-off frequency value that is intermediate the frequency values of said fundamental component and the next adjacent harmonically related wave component.

7. In a system for deriving an indication of the frequency of the fundamental wave component of a variable frequency complex wave which includes a plurality of wave components in integral harmonic frequency relation, a frequency-sensitive selecting device selective of that portion of the frequency spectrum of said wave components that includes the range of frequencies such fundamental component might be expected to have, said device including a variable reactance element, voltage deriving means for producing an electromotive force, the magnitude of which is proportional to the frequency separation between said integrally related wave components, means responsive to said electromotive force for controlling the frequency-sensitive characteristics of said selective device by controlling the reactive value of said reactance element, and means also responsive to said electromotive force for producing an alternating voltage the variations in the frequency of which are indicative of the variations in the frequency of the fundamental component of said wave.

8. A system for segregating the lowest frequency wave component from a complex wave which includes a plurality of wave components in integral harmonic frequency relation, which system comprises means for selecting that fractional part of the frequency spectrum of said wave that includes the range of frequencies that the lowest of such harmonically related components might be expected to have, said selecting means comprising a reactance element the effective value of which is controllably variable, means for limiting the amplitude of the wave components included in said selected portion to a predetermined energy level, means responsive to the components of said limited selected wave portion for generating a unidirectional voltage the magnitude of which is proportional to the interval between successive instantaneous wave-energy levels of a predetermined magnitude, a first means for controlling the effective reactance value of said reactance element at a predetermined value, a second means responsive to said unidirectional voltage for controlling the effective reactance value of said element in accordance with the magnitude of said voltage, and means connected to the output of the voltage generating means and responsive to said generated voltage for incapacitating said first controlling means during the interval said second controlling means is responding to said generated voltage.

9. A system for segregating the wave components of a complex wave which includes a number of wave components in integral harmonic frequency relation, which system comprises means including a variable inductance element for selecting that fractional part of the frequency spectrum of said complex wave that includes the range of frequencies that the lowest of such harmonically related components might be expected to have, a first means for controlling the inductive value of said inductance element at a predetermined value, means responsive to said selected wave portion for generating a unidirectional voltage the magnitude of which varies in accordance with the frequency separation of said wave components, a second means responsive to the magnitude of said unidirectional voltage for controlling the effective value of said inductance element, and means responsive to said unidirectional voltage for incapacitating said first inductive controlling means during the interval when said second control means is regulating the effective value of said inductance element.

10. A system for segregating the fundamental wave component from a plurality of complex wave components in integral harmonic frequency relation, which system comprises means including a variable inductance element for selecting that fractional part of the frequency spectrum of said complex wave that includes the range of frequencies such fundamental component might be expected to have, a first means for adjusting the inductive value of said inductance element to its minimum operating value, means responsive to the selected portion of said wave for producing a unidirectional voltage the magnitude of which is proportional to the frequency interval that separates adjacently disposed components of said wave, a second means responsive to said unidirectional voltage for controlling the effective value of said inductance element in accordance with the magnitude of said derived unidirectional voltage, means responsive to said unidirectional voltage for disabling said first-mentioned inductance controlling means during the interval that said second control means is exerting its control force, and output connections for receiving said segregated fundamental component.

11. In a combination for producing an indication of the instantaneous frequency of the fundamental component of a variable frequency complex wave, which wave includes a number of components in integral harmonic frequency relation, a source of said complex wave in electrical form, and means for segregating from the electrical form of said wave the lower frequency portion only of the frequency spectrum of the wave components, said means comprising a reactive electrical network the reactance of which is variable in magnitude, means for deriving from said segregated portion an electromotive force representative of and varying with variations in the frequency of the fundamental component of the complex wave, and means responsive to said derived electromotive force for varying the reactance of said network such that the frequency portion segregated by said network includes such fundamental component exclusive of any harmonic thereof.

12. In combination, a source of variable frequency complex waves including a fundamental component, an electrical network connected thereto and comprising inductive and capacitive reactive elements initially adjusted to transmit the lower frequency portion of the frequency spectrum of said waves, means for deriving from such portion of said waves a variable electromotive force representative of the fundamental component of said wave and the amplitude of which changes in accordance with changes in the frequency of the fundamental component of said complex waves, and control means responsive to said derived electromotive force for variably adjusting the reactive value of at least one of said network elements such that the network transmits frequencies at least including such fundamental frequency exclusive of the harmonics thereof.

13. In combination, a source of variable frequency complex waves including a fundamental component, an electrical network connected thereto and comprising inductive and capacitive reactive elements proportioned to have an upper cut-off frequency above the highest frequency such fundamental component might be expected to have, means responsive to wave components after passing through said network for deriving therefrom an electromotive force representative of such fundamental component and the amplitude of which varies in accordance with the frequency of such fundamental component of said complex waves, and control means responsive to such derived electromotive force for variably adjusting the reactive value of at least one of said network elements and thereby to shift the upper cut-off frequency of the network to a value enabling the transmission through the network of the fundamental component of which the derived electromotive force is representative but suppressing harmonics of such fundamental component.

14. In combination, a source of variable frequency complex wave including a fundamental component, an electrical network connected thereto and comprising inductive and capacitive reactive elements proportioned to have initially an upper cut-off frequency above the highest frequency such fundamental component might be expected to have, means responsive to wave components of said complex wave for deriving an electromotive force representative of such fundamental component and the magnitude of which varies in accordance with the frequency of such fundamental component, and control means responsive to said derived electromotive force for adjusting the reactive value of at least one inductive element of said network in proportion to the magnitude of the electromotive force to thereby adjust the upper cut-off frequency of the network to one that suppresses harmonics of the fundamental component of which the electromotive force is representative.

ROBERT R. RIESZ.

REFERENCES CITED

The following references are of record in the file of this patent:

UNITED STATES PATENTS

| Number | Name | Date |
| --- | --- | --- |
| 1,976,481 | Castner | Oct. 9, 1934 |
| 2,151,091 | Dudley | Mar. 21, 1939 |